Oct. 23, 1928.
E. F. TERRY, JR
LUBRICATOR
Filed Feb. 17, 1926
1,688,946
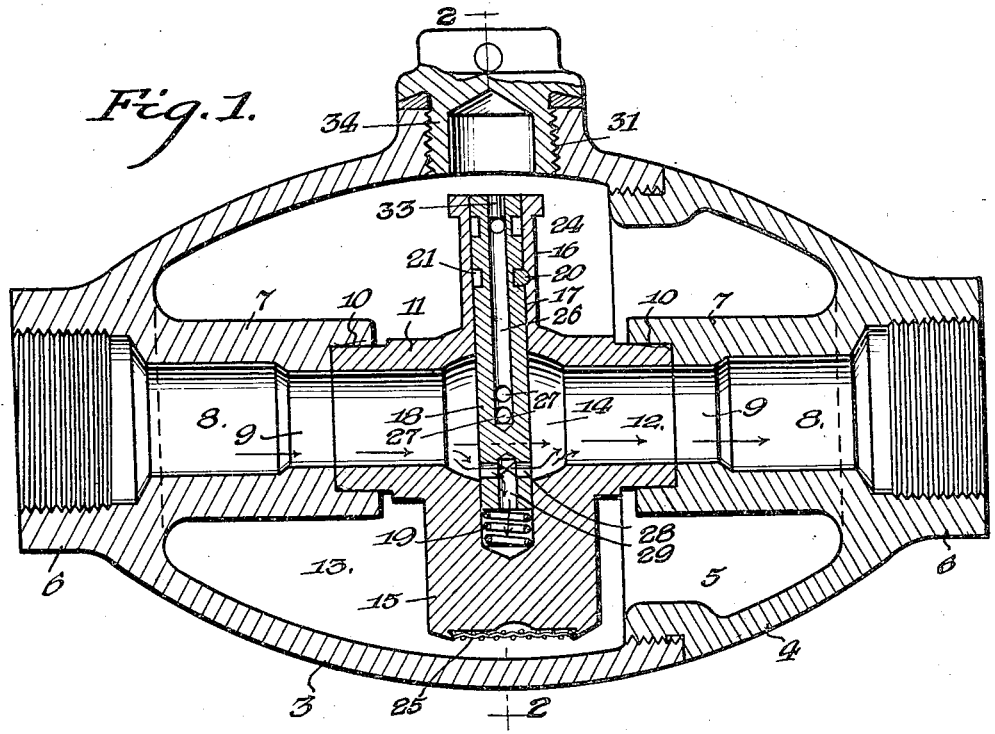
Fig. 1.
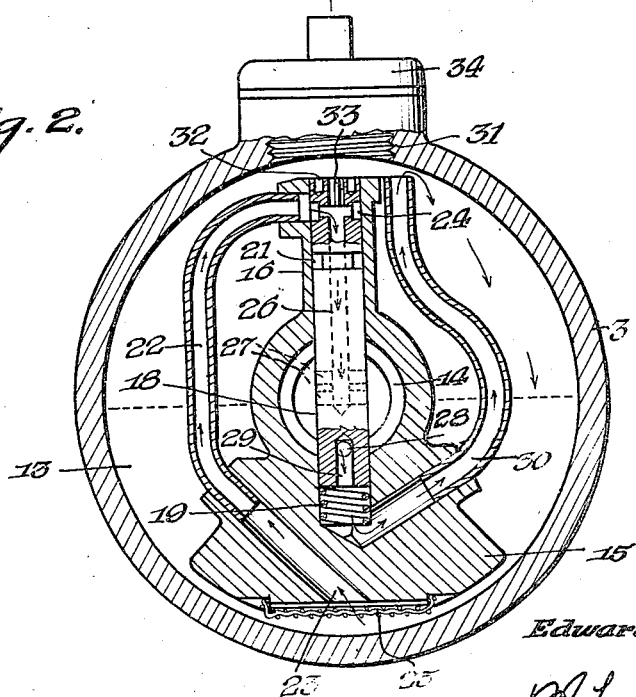
Fig. 2.
Inventor
Edward F. Terry Jr.
By 
Attorney Patented Oct. 23, 1928.

1,688,946

UNITED STATES PATENT OFFICE.

EDWARD F. TERRY, JR., OF DENVER, COLORADO, ASSIGNOR, BY MESNE ASSIGNMENTS, TO THE GARDNER-DENVER COMPANY, OF QUINCY, ILLINOIS, A CORPORATION OF DELAWARE.

LUBRICATOR.

Application filed February 17, 1926. Serial No. 88,866.

The present invention relates to that type of lubricator which is placed in a hose line, the lubricant being introduced into the fluid passing through such line. While it is particularly intended and adapted for use in flexible hose lines, it of course is not limited to such use.

In devices of this kind it has heretofore been essential that the lubricator be maintained in a predetermined position in order that the lubricant will flow from the reservoir into the hose line, because if turned or tipped over, the channel through which the lubricant enters the fluid passageway may have its inlet end above the level of the lubricant and the flow of lubricant is thus stopped. Inasmuch as the hose lines are apt to be moved during the operation of the instrument or apparatus connected to it, there is considerable opportunity of the lubricator being thus turned or tilted.

One of the primary objects of the invention is to provide a simple lubricator of an effective character, which is operative, irrespective of the position it may take. Another and important object is to provide a lubricator by which the reservoir may be substantially filled and still be operative. Still another object is to provide novel means of an effective character by which the amount of lubricant delivered into the motive fluid can be varied.

In the accompanying drawings:—

Figure 1 is a longitudinal sectional view through the preferred embodiment of the invention, Figure 2 is a vertical cross sectional view on the line 2—2 of Figure 1.

A casing of general ovoidal character is employed, comprising sections 3 and 4 that are threaded together, as shown at 5. The ends of the casing have coupling nipples 6, to which the hose may be attached in any wellknown manner. The ends also have inwardly extending tubular nipples 7, the bores 8 of which have reduced inner portions 9. Bearing sockets 10 are formed in the inner ends of the nipples.

A sleeve 11 has its ends journaled in the sockets 10 and bridges the space between the inner ends of the nipples 7, the bore 12 of this sleeve forming with the bores 8 and 9 a fluid passageway longitudinally through the casing. The interior of the casing around said passageway constitutes a lubricant reservoir 13.

The central portion of the bore 12 of the sleeve is enlarged as shown at 14. One side the sleeve is provided with a pendulum mass 15, and on the opposite side with an upstanding tubular portion 16. Said portion 16 and the pendulum mass 15 have a stem chamber 17 that is disposed transversely of the bore 12—14. In this chamber is rotatably mounted a stem 18, the lower end of which is seated on a coiled spring 19, the stem being held in place by a transverse pin 20 engaged in an annular groove 21 formed in the stem.

A lubricant-conducting conduit 22 has a lower inlet end 23 formed in the bottom of the pendulum mass and extends upwardly where it is in communication with an annular groove 24 formed in the upper end of the stem 18. The inlet end 23 is preferably covered by a screen 25. The stem furthermore has a longitudinal downwardly extending bore or channel 26 in communication with the groove 24, and said channel has transverse outlet ports 27 which open through opposite sides of the stem 18 midway of the bore 12—14. This stem also has at right angles to the ports 27, fluid inlet ports 28 that are in communication with a downwardly extending channel 29 that opens through the lower end of the stem into the lower end of the bore or chamber 17. From this lower end a conduit 30 leads upwardly and opens into the upper end of the lubricant reservoir 13.

The casing 3—4 is provided with an opening 31 with which the upper end of the stem 18 is adapted to aline, and said end may be provided with means for engagement by a tool to turn the stem. Thus, as shown said end of the stem has sockets 32 for the reception of the prongs of a turning tool. The upper end of the bore 26 is also preferably closed by a plug 33. The opening 31 is normally closed by a threaded plug 34.

The section 3 constitutes the main body section of the casing and its open end is obviously large enough to permit the pendulum member being introduced therethrough, the section 4 constituting not only the end wall but a closure for the open end of the body section.

With this construction, it will be evident that the motive fluid to be supplied to the apparatus and conveyed by a hose line passes through the nipples 8 and bore of the sleeve 11. If lubricant is in the reservoir 13 and the parts are as shown in the drawing, a portion of the motive fluid will pass through the ports 28 and a part will be deflected, as indicated by the arrows, downwardly through the channel 29 and thence upwardly through the conduit 30 into the upper part of the reservoir, placing pressure on the lubricant in said reservoir. As a consequence lubricant will rise through the conduit 22, and thence passing downward to the channel 26, will escape through the ports 27 and be caught by the passing fluid and carried away with it. By turning the stem the pressure in the lubricant reservoir can be varied, thus altering the amount of lubricant delivered.

With this structure it will be evident that irrespective of how the casing 3 may turn or roll the pendulum mass 15 will maintain the motive fluid supply and lubricant delivery means always in a vertical position, thus insuring that the inlet 23 of the lubricant conduit will be submerged in the lubricant, while the air delivery conduit 30 will be above the level of the same. Furthermore by the arrangement disclosed, it will be evident that the reservoir 13 may be nearly filled with liquid without overflowing into the conduit 30.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. A lubricator comprising a casing having a lubricant reservoir and a fluid passageway that extends through the reservoir, and means for causing the lubricant to pass from any of a plurality of portions of the chamber to the passageway, accordingly as said portion becomes lower by the turning of the casing.

2. A lubricator comprising a casing having a lubricant reservoir and a fluid passageway that extends through the reservoir, and means for conducting the lubricant from any of a plurality of portions of the chamber to the passageway and conducting fluid from the passageway into any of different portions of the chamber, accordingly as said different portions become lower and upper respectively on the turning of the casing.

3. In a lubricator, the combination with a casing having a lubricant reservoir and a passageway for the flow of fluid, of means movably mounted in the casing for delivering lubricant from the reservoir to the fluid flowing through the passageway and having communication with said passageway between its ends, said means being automatically movable to different positions with respect to the casing according to the positioning of the casing.

4. In a lubricator, the combination with a casing having a lubricant reservoir and an open ended passageway for the flow of fluid, of a pendulum member swingingly mounted in the casing and having means for delivering lubricant from the reservoir into the passageway between the ends thereof.

5. In a lubricator, the combination with a casing having a lubricant reservoir and an open ended passageway for the flow of fluid. of a pendulum member swingingly mounted in the casing and through which the passageway extends, said pendulum having a channel opening into the portion of the passageway that is in said pendulum member for directing lubricant from the reservoir into said passageway.

6. In a lubricator, the combination with a casing having a lubricant reservoir and a passageway for the flow of fluid, of a pendulum member swingingly mounted in the casing and through which the passageway extends, said pendulum having a channel for directing lubricant from the reservoir into said passageway, and a channel for admitting fluid from the passageway into the reservoir.

7. In a lubricator, the combination with a casing having a lubricant reservoir and alined passageway nipples, of a pendulum comprising a sleeve having rotatable mountings on the nipples and constituting means of communication therewith, a pendulum mass carried by the sleeve, and means on said passageway for admitting fluid from the sleeve to the reservoir and admitting lubricant from the reservoir to the sleeve.

8. In a lubricator, the combination with a casing having a lubricant reservoir and alined passageway nipples, of a pendulum comprising a sleeve having rotatable mountings on the nipples and constituting means of communication therewith, a pendulum mass carried by the sleeve, and a lubricant conducting passageway having an inlet at the lower portion of the pendulum mass and an outlet in the sleeve.

9. In a lubricator, the combination with a casing having a lubricant reservoir and alined passageway nipples, of a pendulum comprising a sleeve having rotatable mountings on the nipples and constituting means of communication therewith, a pendulum mass carried by the sleeve, a lubricant conducting passageway having an inlet at the lower portion of the pendulum mass and an outlet in the sleeve, and a fluid conducting passageway having an inlet in the sleeve and an outlet in the upper portion of the reservoir.

10. In a lubricator, the combination with a casing having a lubricant reservoir and alined passageway nipples, of a pendulum comprising a sleeve having rotatable mountings on the nipples and constituting means of communication therewith, a pendulum mass carried by the sleeve, a lubricant conducting passageway having an inlet at the lower portion of the pendulum mass and an outlet in the sleeve, and means for controlling the passageway.

11. In a lubricator, the combination with a casing having a lubricant reservoir and alined passageway nipples, of a pendulum comprising a sleeve having rotatable mountings on the nipples and constituting means of communication therewith, a pendulum mass carried by the sleeve, a lubricant conducting passageway having an inlet at the lower portion of the pendulum mass and an outlet in the sleeve, a fluid conducting passageway having an inlet in the sleeve and an outlet in the upper portion of the reservoir, and means for controlling both passageways.

12. In a lubricator, the combination with a casing having a lubricant reservoir, of a fluid passageway extending therethrough, and a lubricant conducting channel having an inlet in the lower portion of the reservoir and extending to the upper portion thereof and having a downwardly extending portion provided with an outlet in the passageway.

13. In a lubricator, the combination with a casing having a lubricant reservoir, of a fluid passageway extending therethrough, and a lubricant conducting channel having an inlet in the lower portion of the reservoir and an outlet in the passageway, said channel extending to the upper portion of the reservoir and to a point above its outlet.

14. In a lubricator, the combination with a casing, having a lubricant reservoir, of a tubular member within the casing constituting a fluid passageway, a conduit leading from the lower portion of the reservoir to the upper portion thereof, and a downwardly extending channel leading from the upper portion of the conduit and opening into the fluid passageway.

15. In a lubricator, the combination with a casing having a lubricant reservoir, of a tubular member within the casing constituting a fluid passageway, a conduit leading from the lower portion of the reservoir to the upper portion thereof, and a rotary controlling device in said member having a channel in communication with the conduit and with the fluid passageway.

16. In a lubricator, the combination with a casing having a lubricant reservoir, of a tubular member within the casing constituting a fluid passageway, a conduit leading from the lower portion of the reservoir to the upper portion thereof, a rotary controlling stem having a bore that is in communication at its upper end with the conduit and has an outlet port at its lower end opening into the fluid passageway.

17. In a lubricator, the combination with a casing having a lubricant reservoir, of a tubular member within the casing constituting a fluid passageway, means for admitting lubricant from the reservoir to the passageway, and a fluid conduit having an inlet in the passageway and leading downward therefrom and thence upwardly and opening into the upper portion of the reservoir.

18. In a lubricator, the combination with a casing having a lubricant reservoir, of a tubular member rotatably mounted on the casing and constituting a fluid passageway, said member having a pendulum mass on one side and a stem chamber opening through the opposite side and intersecting the passageway, a rotatable stem in the chamber, and a lubricant conduit and a fluid conduit communicating with the reservoir and fluid passageway and controlled by the stem.

19. In a lubricator, the combination with a casing having a lubricant reservoir, of a tubular member rotatably mounted on the casing and constituting a fluid passageway, said member having a pendulum mass on one side and a stem chamber opening through the opposite side and intersecting the passageway, a rotatable stem in the chamber, a lubricant conduit and a fluid conduit communicating with the reservoir and fluid passageway and controlled by the stem, said casing having an opening with which the stem alines, and a detachable closure for the opening.

20. In a lubricator, the combination with a casing having a lubricant reservoir, of a tubular member rotatably mounted on the casing and constituting a fluid passageway, said member having a pendulum mass on one side and a stem chamber opening through the opposite side and intersecting the passageway, a rotatable stem in the chamber and having separate passageways opening through its sides and through its ends respectively, and oppositely extending conduits opening into opposite portions of the lubricant reservoir and having communication respectively with the passageways of the stem.

21. A lubricator comprising a casing having a shape that will permit it to roll freely, said casing having a fluid passageway therethrough and having means for coupling hose to its ends and in communication with the passageway, the interior of said casing about the passageway constituting a lubricant reservoir, and means for delivering lubricant from the lower portion of the reservoir to the passageway irrespective of which portion becomes the lower portion due to the rolling of the body.

22. A lubricator comprising an elongated casing that is generally circular in cross section to permit it to roll freely, said casing having an open ended fluid passageway therethrough that is substantially coaxial to the casing, means for connecting a hose line to the ends of the casing in communication with the passageway, the interior of said casing constituting a lubricant reservoir, and a lubricant supply device movably supported in the casing and having a conduit, provided with an inlet that maintains a position in the lower portion of the lubricant reservoir as the casing rolls, said conduit having an outlet into the fluid passageway.

23. A lubricator comprising a lubricant reservoir casing and a swinging pendulum member in the casing, said casing having a fluid passageway therethrough, and means in the pendulum member for directing lubricant from the reservoir into the passageway, said casing comprising a body section having an open portion of sufficient area to permit the insertion of the pendulum member into the casing and a closure section for the body section.

24. A lubricator comprising a lubricant reservoir casing and a swinging pendulum member in the casing, tubular nipples on which the pendulum member is journaled, said casing nipples and pendulum member having a passageway formed therethrough that opens through the opposite ends of the casing, and means in the pendulum member for directing lubricant from the reservoir into the passageway, said casing comprising a body section having an open portion of sufficient area to permit the insertion of the pendulum member into the casing, and a closure section for the body section threaded to the casing section.

In testimony whereof, I affix my signature.

EDWARD F. TERRY, Jr.